Figures 1, 2, 3:
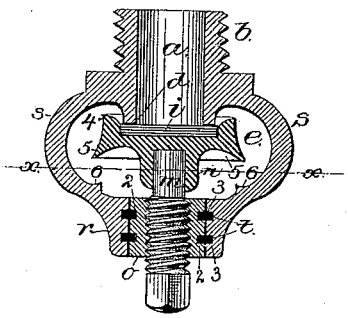

(No Model.)

C. C. WALWORTH.
AUTOMATIC FIRE EXTINGUISHER.

No. 271,669. Patented Feb. 6, 1883.

Witnesses.
John F. C. Preinkert
Fred N. Powell

Inventor.
Caleb C. Walworth
by Crosby & Gregory Attys.

UNITED STATES PATENT OFFICE.

CALEB C. WALWORTH, OF BOSTON, MASSACHUSETTS.

AUTOMATIC FIRE-EXTINGUISHER.

SPECIFICATION forming part of Letters Patent No. 271,669, dated February 6, 1883.

Application filed November 17, 1882. (No model.)

*To all whom it may concern:*

Be it known that I, CALEB C. WALWORTH, of Boston, county of Suffolk, State of Massachusetts, have invented an Improvement in Automatic Fire-Extinguishers, of which the following description, in connection with the accompanying drawings, is a specification, like letters on the drawings representing like parts.

My invention, relating to automatic fire-extinguishers, has for its object to produce a stronger, more reliable, and more sensitive extinguisher than those commonly used, and is embodied in an extinguisher of that class in which the water is kept back by a valve that is held in place by an easily-fusible solder or substance that is fused or weakened at a low temperature by the heat of a conflagration, thus permitting the valve to open and the water to be distributed over the fire and thus extinguish it.

The extinguisher consists of a tubular neck provided at one end with screw-threads, by which it is connected with the distributing-pipes in the usual manner, (it having wrench-faces for turning it,) and provided at its other end with a valve-seat which receives the valve, shown in this instance as having its seating-face composed of Jenkins packing or equivalent material, preferably coated with black-lead to prevent sticking to the seat. The valve is held upon its seat by a threaded stem entering a socket in the valve, in which it rotates freely, so that the valve may be pressed against its seat without turning thereon. The valve-stem works in a nut connected by the fusible solder or equivalent material with a sleeve or socket-piece connected with the neck or portion of the distributer having the valve-seat; and as herein shown the said nut and sleeve or socket each have one or more corresponding annular grooves which receive the fusible solder or connecting material run in in a molten state, the material thus forming rings which support the pressure of the water upon the valve tending to unseat it, and the said rings, when weakened by a rise in temperature, yield and permit the valve to leave its seat, letting the water flow. The valve is provided with a guiding-flange by which a small amount of water—such as might leak or escape at first in case the valve opened gradually—is prevented from coming in contact with the nut and its socket, and thus cooling the fusible solder, so as to prevent its further weakening and the complete release of the valve.

In the apparatus illustrated the valve, when unseated, remains supported upon the socket for the nut, and itself serves as a distributer for the jet of water flowing through the passage in the neck portion of the distributer.

Figure 1 is a longitudinal section of an automatic fire-extinguisher embodying this invention; Fig. 2, a transverse section thereof on line $x$ $x$, and Fig. 3 a side elevation.

The extinguisher consists mainly of a tubular neck portion, $a$, provided at one end with screw-threads $b$, by which it may be connected with the water distributing or supply pipe in the usual manner, it also having wrench-faces $c$ (see Fig. 3) to enable it to be turned by a wrench. The said neck portion is provided at its other end with a valve-seat, $d$, to receive a valve, $e$, preferably provided with a face, $i$, of Jenkins packing or other suitable packing material, the surface of which may be covered with black-lead to prevent it from sticking to its seat.

The valve is held to its seat by a stem, $m$, entering a socket, $n$, in the valve, in which it rotates freely, so that the valve need not turn with the said stem, which is threaded and screwed into a threaded socket or nut, $o$, held by fusible solder or equivalent material in a sleeve or socket-piece, $r$, connected by arms $s$ with the neck portion $a$ of the extinguisher.

The outer surface of the nut $o$ is provided with one or more grooves, 2, and the inner surface of the sleeve $r$ has corresponding grooves, 3, so that when the said nut is inserted in the said sleeve annular spaces are afforded between them, into which the connecting or soldering material is run, thus forming a series of rings, $t$, which receive the pressure upon the valve, due to the reaction of its seat, and also to the pressure of the water.

The valve-stem is squared to receive the key or wrench, by which it may be rotated to press the valve against its seat; and it will be seen that any desired initial pressure may be brought upon the rings $t$, thus straining them so that they will easily yield upon a slight reduction in strength.

The valve $e$ is provided with a ridge, 4, extending upward from its seating-face $i$, and thus forming an annular saucer-like recess which will receive any small amount of water that may leak and afford an opportunity for evaporation, which will usually take place as fast as the water escapes, so that there will be no drip to cause damage.

The valve $e$ also has a guide-flange, 5, overhanging the sleeve $r$ and its inclosed nut, so that if the valve opens gradually or yields sufficiently to let the water leak or drip without having a free outlet the said water will not be permitted to come in contact with the said sleeve and nut to cool them and the rings $t$.

The arms $s$ also have guides 6 to direct the water away from the sleeve and nut.

In operation, when the extinguisher is exposed to a higher temperature than that due to natural heat, or artificial heat for warming purposes, the rings soften or melt, releasing the nut $o$ and connected valve-stem $n$, which drop, the valve $e$ being forced from its seat by the pressure of the water, and resting with its socket $n$ in the sleeve $r$. The valve thus supported offers an obstruction to the flow of water in a solid stream from the passage in the neck $a$, breaking up the said stream and causing the water to be distributed or scattered over a considerable space around and beneath the extinguisher, the ridge also causing the water to be sent partly upward, so as to wet the ceiling above the extinguisher.

It will be seen that the means of connecting the nut $o$ and sleeve $r$ and supporting the valve thereon might be employed if the said sleeve were connected with the neck $a$ by a perforated shell or rose for distributing the water instead of the arms $s$.

I claim—

1. The neck provided with a passage for water, and a valve-seat and sleeve, combined with the valve, its loosely-connected stem, and the nut, the said sleeve and nut having corresponding grooves forming chambers for the supporting-rings of fusible or yielding material, substantially as described.

2. The combination of the neck having a valve-seat with a valve provided with a ridge extending above its seating-face, and means to hold the said valve to its seat, as and for the purpose described.

3. The neck and its valve-seat, and valve provided with a guiding-flange, combined with means for holding the valve upon its seat by fusible or yielding material protected from dripping water by the said guiding-flange, substantially as described.

4. The valve, valve-stem, and nut, combined with the neck, having a sleeve or socket for the said nut, and connecting-arms provided with guides for protecting the said sleeve from the escaping water, substantially as described.

In testimony whereof I have signed my name to this specification in the presence of two subscribing witnesses.

CALEB C. WALWORTH.

Witnesses:
JOS. P. LIVERMORE,
BERNICE J. NOYES.